(12) United States Patent
Harting Glade et al.

(10) Patent No.: US 8,981,137 B2
(45) Date of Patent: Mar. 17, 2015

(54) METHOD FOR PRODUCING A CONCENTRATE OF EICOSAPENTAENOIC AND DOCOSAHEXAENOIC ACIDS

(71) Applicant: Golden Omega S.A., Santiago (CL)

(72) Inventors: Tomas Francis Harting Glade, Santiago (CL); Miguel Angel Diaz Fuenzalida, Santiago (CL); Alejandro Markovits Rojas, Santiago (CL)

(73) Assignee: Golden Omega S.A., Santiago (CL)

( * ) Notice: Subject to any disclaimer, the term of this patent is extended or adjusted under 35 U.S.C. 154(b) by 0 days.

(21) Appl. No.: 14/016,426

(22) Filed: Sep. 3, 2013

(65) Prior Publication Data

US 2014/0005425 A1 Jan. 2, 2014

Related U.S. Application Data

(63) Continuation of application No. 13/375,030, filed as application No. PCT/CL2010/000018 on Jun. 1, 2010, now Pat. No. 8,586,772.

(30) Foreign Application Priority Data

Jun. 2, 2009 (CL) .................................. 1343-2009

(51) Int. Cl.
 *A23D 9/00* (2006.01)
 *C11C 1/02* (2006.01)
 (Continued)

(52) U.S. Cl.
 CPC . *C11C 1/025* (2013.01); *A23D 9/02* (2013.01);
 *C11B 3/006* (2013.01); *C11B 3/04* (2013.01);
 *C11B 3/06* (2013.01); *C11C 1/08* (2013.01);
 *C11C 3/003* (2013.01)
 USPC ......................................................... 554/224

(58) Field of Classification Search
 CPC ................................ C07C 57/00; C07C 57/02
 USPC ............................................................ 554/224
 See application file for complete search history.

(56) References Cited

U.S. PATENT DOCUMENTS 3,932,531 A * 1/1976 Kurata et al. ................. 568/618
6,846,942 B2 1/2005 Rubin (Continued)

FOREIGN PATENT DOCUMENTS

CN 1204638 A 1/1999
GB 2350610 A 12/2000

(Continued)

OTHER PUBLICATIONS

European Commission, "Provision (EU) N° 252/2012 to establish the sampling process and methods of analysis for the official control of dioxin contents, PCB similar to dioxin and PCB not similar to dioxin in specific food products, and also to abolish the provision (EC)", Official Bulletin of the European Union: European Commission, Mar. 21, 2012. (With English translation.).

(Continued)

*Primary Examiner* — Deborah D Carr
(74) *Attorney, Agent, or Firm* — Fish & Richardson P.C.

(57) ABSTRACT

The current invention describes processes for obtaining of concentrates of esters of eicosapentaenoic acid and docosahexaenoic acid for their use in massive and regular human consumption either as a pharmaceutical ingredient or as a food ingredient, which are characterized by having neutral and stable organoleptic properties, free of side effects, which are typical from marine oils derivatives, and with low content of Persistent Organic Pollutants (POP).

3 Claims, 1 Drawing Sheet

(51) Int. Cl.
*A23D 9/02* (2006.01)
*C11B 3/00* (2006.01)
*C11B 3/04* (2006.01)
*C11B 3/06* (2006.01)
*C11C 1/08* (2006.01)
*C11C 3/00* (2006.01)

(56) References Cited

U.S. PATENT DOCUMENTS

| | | |
|---|---|---|
| 2004/0022923 A1 | 2/2004 | Hjaltason |
| 2007/0213298 A1 | 9/2007 | Rongved et al. |
| 2009/0011012 A1* | 1/2009 | Baum .......................... 424/463 |
| 2009/0221705 A1 | 9/2009 | Rongved et al. |

FOREIGN PATENT DOCUMENTS

| | | |
|---|---|---|
| WO | WO8911521 A1 | 11/1989 |
| WO | WO9964547 A1 | 12/1999 |
| WO | WO 0206430 A1 * | 1/2002 |
| WO | WO0206430 A1 | 1/2002 |
| WO | WO2004007654 A1 | 1/2004 |
| WO | WO2007091070 A1 | 8/2007 |

OTHER PUBLICATIONS

European Commission, "Provision N° 1881/2006 (EC) to establish the maximum contents of specific contaminations in food products", Official Bulletin of the European Union: European Commission, Dec. 19, 2006. (With English translation.).

Company EPAX A.S., "Specification of EPAX 5500 EE", Advertising pamphlet, Jan. 6, 2006.

Company EPAX, "Maximum Specifications Limits for Oxidation Products", EPAX advertising for formula Marine Omega-3, Apr. 2008.

Bays, Harold, "Clinical Overview of Omacor: A Concentrated Formulation of Omega-3 Polyunsaturated Fatty Acids", The American Journal of Cardiology, N° vol. 98, Nov. 2006.

Company Cognis GmbH, "Product Specification Omevital 33/22", Specification of the product, Nov. 24, 2006.

Company Cognis GmbH, "Advertising pamphlet for Omevital", Omevital Omega-3 fatty acids, 2006.

Liang et al., Fractionation of Squid Visceral Oil Ethyl Esters by Short-Path Distillation, JAOCS, N° vol. 77, Nov. 2000.

Wijesundera et al., "Eicosapentaenoic Acid Geometrical Isomer Artifacts in Heated Fish Oil Esters", JAOCS, N° vol. 66, Nov. 1989.

Company UIC GmbH, "Short Path Distillation in the Fish Oil Industry", Company pamphlet, Sep. 2, 2006.

European Commission, "Provision N° 1883/2006 to establish the sampling process and methods of analysis for the official control of contents of dioxins and PCB similar to dioxins in specific food products", Official Bulletin of the European Union: European Commission, Dec. 19, 2006. (With English translation.).

ICH Expert Working Group, Validation of Analytical Procedures: Text and Methodology Q2(R1), ICH Harmonized Tripartite Guideline, Nov. 2005.

BASF Opposition filed on Jan. 24, 2014 in European Patent No. EP 2 438 819.

* cited by examiner

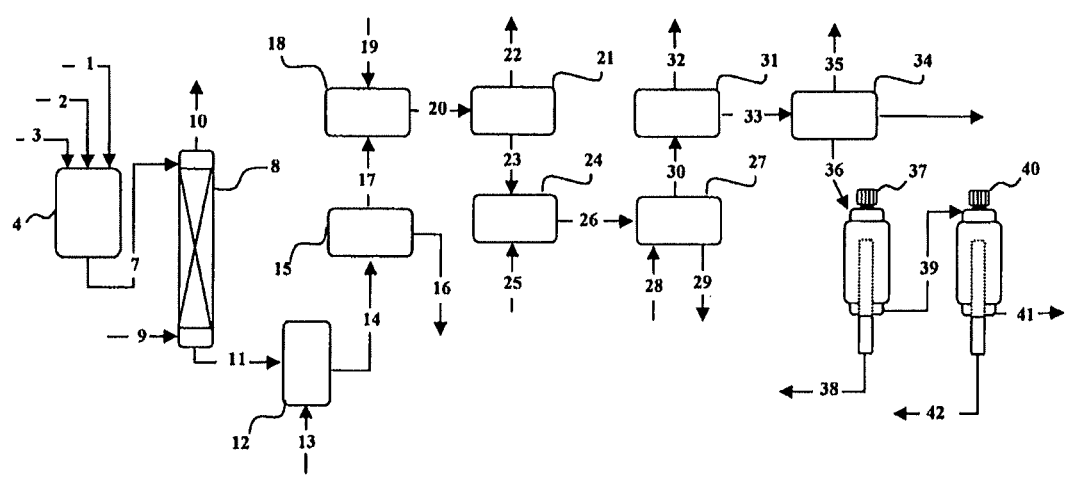

METHOD FOR PRODUCING A CONCENTRATE OF EICOSAPENTAENOIC AND DOCOSAHEXAENOIC ACIDS

FIELD OF THE INVENTION

This invention is related to a process for obtaining a concentrate of esters of eicosapentaenoic and docosahexaenoic acids from crude or refined marine oils.

BACKGROUND OF THE INVENTION

The importance of long-chain polyunsaturated fatty acids of the ω-3 type, the acids (all cis)-5, 8, 11, 14, 17 eicosapentaenoic, hereinafter EPA, and (all cis)-4, 7, 10, 13, 16, 19 docosahexaenoic, hereinafter DHA, for ingredients of food or pharmaceutical products is well known and documented because of their usefulness, among others, to prevent arteriosclerosis and cardiovascular diseases, alleviate inflammatory conditions and delay the growth of tumors. As a consequence, experts recommend a daily intake of said fatty acids ranging between 0.5 and 10 g.

One of the richest sources of EPA and DHA are fish oils of different origin such as sardines, jack mackerel, anchovy, salmon, codfish and others. Typically, the combined content of EPA and DHA in said oils is around 10 to 35% in weight. Consequently, the first attempts to provide food supplements and pharmaceuticals rich in EPA and DHA were based on refined fish oils in order to remove their characteristic unpleasant odor and flavor, for their utilization as ingredients for food or pharmaceutical product suitable for human consumption. These refining processes resorted mainly to the classic processes for vegetable oil refining oils and specific adaptations of said processes to the raw material concerned (Lindsay, U.S. Pat. No. 4,915,876; Chang, U.S. Pat. No. 4,874,629; Marschner, U.S. Pat. No. 4,804,555; Stage, U.S. Pat. No. 4,599,143; Merck, U.S. Pat. No. 4,838,997).

Nevertheless, current attempts to provide EPA and DHA from refined marine oils suitable as ingredient for food and pharmaceutical product, have not been successful to provide a product whose organoleptic properties were acceptable and were free of the typical secondary effects such as gastric reflux, stomach and skin irritation and meteorism, among others. These effects are accentuated when EPA and DHA are consumed in quantities over 1 g, that is, doses equivalent to about 5 g of fish oil, producing the mentioned secondary effects in the consumer.

Consequently, the efforts to provide EPA and DHA have been directed towards the production of concentrates of these acids from marine oils. These concentrates may contain between 40 to 95% of EPA and DHA in weight, either in the form of free acids, in the form of esters, typically ethyl esters or mono, di or triglycerides. The aim of these processes is to provide concentrates of EPA and DHA that have better organoleptic properites of flavor, odor and color, that can be used directly in products for therapeutic use in humans, as an active pharmaceutical ingredient or as food ingredients in general. Nevertheless, the state of art does not provide processes capable of providing products fulfilling the characterisitics of having good sensory properties, long term storage and oxidative stability to keep their desirable organoleptic properties over time, that is, products in which reversion in time to fishy odor and flavor do not occur and which lack of the typical secondary effects of the marine oils and their derivatives, such as gastric reflux, flattulence, allergy among others.

Concentrates of EPA and DHA currently available commercially are not used directly as food ingredient, but instead they are utilized in form of syrups in which the flavor has been camouflaged or in form of sugar-coated or micro-encapsulated pills, all this with the purpose of hiding or minimizing the undesirable flavor and odor that develop in time in said products. Additionally, these concentrates are not suitable either for therapeutic uses that normally require relatively high doses of EPA or DHA, several grams per day, because at these doses the undesirable secondary effects of the concentrates are even more accentuated.

Another approach for providing EPA or DHA for human consumption derived from marine oils has been the development of processes to obtain pure EPA or DHA, as is disclosed in U.S. Pat. No. 6,846,942. Nevertheless, obtaining pure EPA or DHA means passing first through a step where a mixture of EPA and DHA is obtained; commercially there does not seem to be an advantage to this approach, and as can be observed in the documents of Table 1, most of the processes disclosed deal with the preparation of concentrates containing EPA and DHA either in the form of free acids or in the form of esters.

Numerous processes disclosed in the prior art, addressed to obtain of concentrates of ω-3 fatty acids from oil are shown in Table 1.

European patent No. 0 409 903 discloses a process for preparing mixtures containing EPA and DHA from animal or vegetable oils. The process comprises the steps of saponifying the raw material, the animal or vegetable oil, acidifying the saponified mixture immediately and then extracting the acids formed with petroleum ether until exhaustion. The extracts are then washed with water, the solvent removed and the residue subjected to one or more steps of molecular distillation at a pressure of 0.133 Pa and a temperature between 110-120° C. A distillate is obtained that contains between 35 and 90% of EPA and DHA.

TABLE 1

Patents and Patent Applications for methods or processes for the production of DHA and EPA

| Document | Title |
|---|---|
| 20030027865 | Method for isolating highly purified fatty acids using crystallization. |
| 20040022923 | Marine oils with reduced levels of contaminants |
| 20040236128 | Method for preparing pure EPA and pure DHA |
| 20050201997 | Promoter of elimination of dioxins |
| 20050256326 | Process for decreasing environmental contaminants in an oil or fat, a fluid for decreasing volatile environmental contaminants, a food supplement |
| 20080268117 | Method for purifing oils that contain EPA and DHA |
| 3682993 | Purification of oils |
| 4554107 | Refined fish oils and the process for producing them |
| 4599143 | Process for physical deodorizing and/or refining of oils, fats, edible organic esters with a high boiling point. |
| 4623488 | Refined fish oils and the process for producing them |

TABLE 1-continued

Patents and Patent Applications for methods or processes for the production of DHA and EPA

| Document | Title |
|---|---|
| 4675132 | Polyunsaturated fatty acids of fish oils |
| 4692280 | Purification of fish oils |
| 4792418 | Method for extraction and purification of polyunsaturated fatty acids originating from natural sources. |
| 4838997 | Process for deodorizing triglyceride oils |
| 4855154 | Process for deodorizing marine oils |
| 4874629 | Purification of fish oil |
| 4915876 | Process for deodorizing and stabilizing polyunsaturated oils |
| 4966734 | Deodorizing of mixtures of fatty esters |
| 5006281 | Process for the production of animal oils |
| 5023100 | Fish oil |
| 5130061 | Process for the extraction of esters from polyunsaturated fatty acids from fish oils |
| 5679809 | Concentrate of ethyl esters of polyunsaturated fatty acids |
| 5693835 | Fish oil with less aroma of fish and a method for its preparation |
| 5945318 | Refining of compositions of oil |
| 6190715 | Process for producing refined edible fish oil from the herring and other similar fish that contain long-chain omega-3 fatty acids. |
| 6204401 | Purification of glycerides of polyunsaturated fatty acids |
| 6214396 | Method and plant for extraction of fish oil and resulting products |
| 6261608 | Method for the preparation of refined fish oil |
| 6528669 | Recuperation of polyunsaturated fatty acids starting with urea adducts |
| 6537787 | Enzymatic methods for enriching with polyunsaturated fatty acids |
| 6664405 | Method for isolating highly purified unsaturated fatty acid using crystallization |
| 6846942 | Method for preparing pure EPA and pure DHA |
| EP0409903B1 | Process for preparing polyunsaturated fatty acids |
| EP0749468B1 | Refining of oil compositions |
| EP0968264B1 | Purification of glycerides of polyunsaturated fatty acids |
| EP1153114B1 | Esterification of marine oil catalyzed by lipase |
| EP1178103A1 | Purification of raw oil with polyunsaturated fatty acids |
| EP1202950B1 | Recuperation of polyunsaturated fatty acids starting with urea adducts |
| EP1996686A1 | Omega 3 |
| JP2007138181 | Process for preparing material with a high content of long-chain polyunsaturated fatty acids |

U.S. Pat. No. 5,130,061 discloses a process for the preparation a mixture of highly concentrated ethyl esters of EPA and DHA from fish oil. The process disclosed includes the steps of transesterifying fish oil with ethyl alcohol, followed by the extraction of the transesterified product with hexane and the purifying of the extract by chromatography in silica gel. Then, the purified product is subjected to one or more steps of molecular distillation at a pressure of about 0.001 mmHg and temperature between 65 to 70° C. Optionally, prior to the distillation, the product resulting from the chromatography may be crystallized in acetone at −40° C. and then subjected to distillation.

Many of the processes disclosed can provide products with acceptable organoleptic properties but in all of them the above-described secondary effects are produced and the reversion to fishy smell and flavor occurs over time, unlike in the product obtained by means of the process of the present invention that keep its neutral organoleptic properties under storage conditions at room temperature during a period of at least three months and without causing significant secondary effects in the consumer. By neutral organoleptic characteristics we mean a product having acceptable organoleptic properties in the absence of additives to mask the flavor or odor, while acceptable organoleptic characteristics are understood to be a product evaluated by a trained sensory panel composed of at least 9 members evaluating product properties such as appearance, aroma and flavor with a qualification of each parameter equal or greater than 60% of the maximum value of said parameter, and the rancidity property, with a qualification equal to or greater than 80% of the maximum value of said parameter.

In addition to the requirement of acceptable organoleptic properties and stability, the concentrates of EPA and DHA must also comply with a series of regulatory norms with regard to their content of contaminating organic compounds known as Persistent Organic Pollutants (POP) that are chemical substances which persist in the environment, accumulate in the food chain and imply a risk of causing adverse effects to human health and to the environment. Among these contaminants, that currently include 17 substances recognized during the third conference of the Parties to the Stockholm Covenants of May 2007, are derivatives of dioxins, furans, polychlorinated biphenyls, polycyclic aromatic hydrocarbons, etc, whose concentration in the fish oils has been increasing over time, so that efforts are being made to develop processes capable of removing these contaminants from fish oils. Among the Parties to the Stockholm Covenants there are currently strict norms with regard to the maximum permissible limits of the POP in products for human consumption, among which include fish oil and products derived from fish oils. Processes specifically addressed to the removal of the POP are found, among others, in the processes disclosed in patent applications US 2005/0256326 and US 2004/0022923 and international application WO 02/06430. Another group of regulated pollutants are heavy metals such as arsenic, mercury, cadmium, and lead, among others.

The processes for the production of concentrates of EPA and DHA described in European patent No. 0 409 903 and in U.S. Pat. No. 5,130,061 do not refer to the problem of the presence of POP. Therefore in order to compare the efficiency for removing contaminants of the processes disclosed with the efficacy of the process of this invention to the same object, the mentioned process were reproduced with raw materials having a known concentration of POP and compared to the products obtained by the process of the present. Results are shown in Comparative Examples 1 and 2.

In U.S. Pat. No. 6,846,946 there is a mention of the problem of polychlorinated biphenyls (PCBs) but no solution is disclosed concerning their removal.

It has been found that, surprisingly, the process of this invention, unlike the processes of the prior art, is capable of providing a product with acceptable organoleptic properties, without producing a reversion to fishy of odor and flavor during a time of storage at room conditions of at least three months and also unlike the processes of the prior art it is also capable of efficiently reducing or eliminating the POP and heavy metals. Additionally, the disclosed process does not cause undesirable cis-trans isomerization of EPA and DHA isomers of unknown metabolic properties, but on the contrary and quite surprisingly, reduce the trans isomers content when they are found in the raw materials.

Pronova BioPharma (www.pronova.com) discloses a process for the production of concentrates of ethyl esters of EPA and DHA for their use as an active pharmaceutical ingredient. In said process, crude fish oil is first desacidified to obtain refined fish oil and this refined fish oil is subjected to a stripping process directed specifically to the removal of contaminants by means of the disclosed process in the US application 2005/0256326. The refined fish oil is obtained is subsequently transesterified with ethyl alcohol. The transesterified product is subjected to several steps of molecular distillation. The distillate is treated with urea, then bleached and redistilled molecularly, obtaining a final product with up to 90% of long-chain ω-3 fatty acids between EPA and DHA. A disadvantage of the process is the possibility of transisomerization during the stripping step. Additionally the commercial product reverts to fishy odor and flavor and all previously mentioned secondary effects can be observed upon ingestion of the product.

The process developed by Napro Pharma (www.napropharma.no/production) for the production of a concentrate of ethyl esters of EPA and DHA is similar to the process of Pronova BioPharma, but without the stripping step and the urea treatment step, but the product also reverts to fishy odor and flavor and all previously mentioned secondary effects can be observed upon ingestion of the product.

In comparison with the concentrates of EPA and DHA obtained by the process of the state of art, the concentrates obtained by the invented process have surprising and unexpected advantages over the prior art as it will be evident from the detailed description of the invention. These advantages include the characteristic of a organoleptical neutral and stable product, which lacks of secondary effects and levels of Persistent Organic Pollutants complying with international regulatory norms. Furthermore, as mentioned above the process not only prevents the formation of cis-trans isomers, but on the contrary, in a surprising and unexpected manner, it reduces the concentration of trans isomers when these are present in the raw material. As a result of all these combined characteristics, the product obtained by the process of this invention is especially adequate for use in therapies that require high doses of EPA and DHA and as a food ingredient.

SUMMARY OF THE INVENTION

An objective of the current invention is to provide a novel process for the preparation of a concentrate of esters of EPA and DHA from marine oils having neutral organoleptic properties, stability and a content of persistent organic contaminants below the allowed limits and consequently suitable for human consumption either as a pharmaceutical or as a food ingredient.

Said objective is achieved by a concentrate that comprise ethyl esters of EPA and DHA obtained by means of a process comprising the following steps:

a) contacting crude or refined marine oil with one or more alkali and water at a temperature not higher than 100° C. until a mixture is obtained a mixture that comprises saponified marine oil;

b) contacting the saponified mixture with one or more organic solvents to form a refined phase, which comprising the alkaline salts of fatty acids and an extract phase;

c) separating the extract phase from the refined phase;

d) mixing the refined phase with an aqueous solution of an acid to form an aqueous phase and a non aqueous phase comprising fatty acids;

e) separating the aqueous phase from the non aqueous phase;

f) mixing the separated non aqueous phase with an alcohol and a esterification catalyst at a temperature not more than 150° C. until an esterified mixture is obtained that comprises esters of fatty acids;

g) removing the catalyst from the esterified mixture to obtain a catalyst-free esterified mixture;

h) removing the solvent from the catalyst-free esterified mixture to obtain esters of fatty acids, and i) distilling the esters in short path distillation column at a temperature of at most 180° C. and at a pressure of less than 1 mbar to obtain a concentrate that comprises esters of EPA and DHA.

The steps of process are synergistically converging toward the objective of the invention in a coordinated manner.

DETAILED DESCRIPTION OF THE INVENTION

Raw Material.

To carry out the invention, any raw material may be used that contains EPA or DHA, preferably fish oils. Suitable raw materials for the invention, such as sardine, anchovy, jack mackerel, Pacific mackerel, tuna fish, cod, salmon, krill and mollusks oils and mixtures of said oils, oils of the sub-products of the processing of marine animals such as the viscera of marine animals, and also oils of microalgae such as, for example, *Nannochloropsis* sp and plankton. In the current invention the word oil also includes fats or waxes that contain EPA or DHA and their by products, such as glycerides and fatty acids.

Although the use of a raw material with a Totox number lower than 30 is preferred, the process of the current invention can also be carried out with raw materials having a higher Totox number as shown in the examples.

To carry out the process of the current invention, crude or refined marine oil is saponified using an alkali to hydrolyze the glycerides or other esters of fatty acids present in crude or refined marine oil to obtain a saponified mixture comprising the alkaline salts of the saponifiable compounds of the crude or refined marine oil and non saponifiable matter. To this end, crude or refined marine oil is contacted with water and one or more appropriate alkalis, and optionally, one or more solvents such as alcohols and hydrocarbons or with one or more appropriate antioxidants. Appropriate alkalis for the saponification process include sodium, potassium, lithium, magnesium hydroxides and mixtures of said hydroxides. The amount of alkali range from 5 to 40 grams of alkali for each 100 g of crude or refined marine oil, although the preferred ratio of alkali to crude or refined marine oil is approximately 15 grams of alkali per 100 g of crude or refined marine oil. The amount of water used range from 10 to 500 g of water per 100 g of crude or refined marine oil, although the preferred ratio of water to crude or refined marine oil ranges from 50 to 200 g of water per 100 g of crude or refined marine oil. When alcohols such as ethanol are used, the amount of alcohol range from 10 to 500 g of alcohol per 100 g of crude or refined marine oil, although the preferred ratio of alcohol to crude or refined marine oil ranges from 50 and 200 g of alcohol per 100 g of crude or refined marine oil. When hydrocarbons such as hexane are used, the amount of solvent ranges 10 to 500 g of solvent per 100 g of crude or refined marine oil, preferably ranges from 50 to 200 g of solvent per 100 g of crude or refined marine oil. When the appropriate antioxidants are used, such as, for example, BHT, tocopheroles or ascorbic acid and their derivatives, the amount of antioxidant used is preferably not greater than 1 g per 100 g of crude or refined marine oil. The contact between crude or refined marine oil, water, one or more alkalis and optionally one or more solvents, can be carried out either continuously or batchwise in agitated vessel at temperature between 10 and 100° C., preferably at temperatures between 40 and 85° C. and at pressures between 0.1 and 5 bar, preferably at atmospheric pressure. The time for completing the saponification of the crude or refined marine oil in the case of batchwise operation or, the time of residence in the case of a continuous operation range from 10 to 400 minutes, preferably from 30 and 120 minutes.

The mixture that comprises saponified marine oil is contacted with one or more organic solvents until an extract phase and a refined phase immiscible with the extract phase are formed, the extract phase comprising organic solvent and dissolved material and the refined phase comprising the alkaline salts of the fatty acids. Said phases are separated either by settling or centrifugation. The contacting between the mixture comprising saponified crude or refined marine oil and the organic solvents can be carried out either batchwise or in continuous manner at temperatures between 10 and 100° C., preferably between 20 and 80° C., and at pressures between 0.1 and 5 bar, preferably at atmospheric pressure. Solvents or mixtures of organic solvents appropriate for the extraction can be elected from the group that consisting of petroleum ether, pentane, hexane, heptanes, octane, cyclohexane, methyl cyclohexane, acetone, toluene, xylene, methyl xylene, ethyl benzene, dichloromethane, chloroform, carbon tetrachloride, ethylene dichloride, ethylene trichloride, ethylene perchloride, dimethyl sulfoxide and tetrahydrofuran. Nevertheless, the preferred solvents comprise aliphatic hydrocarbons such as petroleum ether, pentane, hexane, heptane, octane or mixture of these solvents. The ratio of the solvent or solvents in relation to the saponified mixture ranges from 50 to 1000 g per 100 g of mixture, preferably from 100 to 500 g per 100 g of mixture. Once the refined phase is separated from the extract phase, if wished, it can be again contacted with one or more solvents in the conditions disclosed to form a second extract phase and a second refined phase, and the process of further extracting refined phases can be carried out if wished.

In the acidulation step, the refined phase is contacted with a solution of an acid such as sulfuric acid, hydrochloric acid, phosphoric acid, acetic acid, trichloroacetic or carbonic acid, until an aqueous phase and a non aqueous phase comprising fatty acids are formed. The amount of acid used in the acidulation step may be up to 1.5 times the stoichiometric amount of alkali used in the saponification step, preferably 1.05 times the stoichiometric amount of alkali required for the total neutralization of the refined phase. The amount of acid required to acidify the refined phase can be determined measuring the total alkalinity of the refined phase The contacting of the refined phase and the acid to form an acidifying mixture can be carried out either batchwise or in a continuous manner in a stirred vessel at temperatures between 10 and 100° C., preferably between 20 and 60° C., and pressures between 0.1 and 5 bar, preferably at atmospheric pressure and with residence time, in the case of continuous operation, ranging from 1 to 120 minutes, preferably from 5 to 60 minutes. Optionally, the mixture may also include an antioxidant or a mixture of antioxidants such as, BHT, tocopheroles or ascorbic acid and its derivatives. Following the non aqueous phase is separated from the aqueous phase by settling or centrifugation. The separated non aqueous phase is washed with a washing mixture comprising water, a monohydric alcohol, acetone or an aqueous solution of sodium sulfate or sodium chloride, at temperatures between 10 and 100° C., preferably between 20 and 60° C. and at pressures between 0.1 and 5 bar, preferably at atmospheric pressure. The washed non aqueous phase can optionally be filtered to eliminate insoluble solids. The term non aqueous phase used below designate both the washed non aqueous phase as well as the washed and filtered non aqueous phase, obtained after the acidulation step as described previously.

Optionally, any of the non aqueous phases can be partially or completely desolventized by evaporation of the solvent, preferably at a reduced pressure and at temperatures below 150° C. obtaining what is referred to as a partiality or totally desolventized non aqueous phase.

Optionally, any of the non aqueous or partially or totally desolventized non aqueous phases can be subjected to a crystallization step. To this end, the phase is mixed with a solvent or mixture of solvents selected from the group consisting of petroleum ether, pentane, hexane, heptane, octane, cyclohexane, methyl cyclohexane, toluene, xylene, methyl xylene, ethyl benzene, dichloromethane, chloroform, carbon tetrachloride, ethylene dichloride, ethylene trichloride, ethylene perchloride, dimethyl sulfoxide, dimethyl formamide and tetrahydrofuran, methanol, ethanol, acetone and methyl ethyl ketone. Preferred solvents are hexane, ethanol, acetone or mixtures of these. The amount of solvent to be used in this step may vary between 50 and 1000 g per 100 g of the phase that is crystallized, preferably between 100 and 500 g per 100 g of the phase that is crystallized. The mixture formed is subsequently cooled to a temperature ranging from 0 to −50° C., preferably from −20 to −40° C. until the formation of a solid crystallized phase in a liquid phase. The operation of crystallization may be carried out in batchwise or in a continuous manner and preferably at atmospheric pressure. The crystallized solid phase and the liquid phase are subsequently separated by filtration or centrifugation, preferably at the same final temperature of the crystallization. Then, the solvents of the liquid phase are removed, partially or totally, by evaporation of the solvent to obtain what is then referred to as a first partially or totally desolventized phase produced in the crystallization step comprising EPA and DHA in higher concentration than that of the crude or refined marine oil utilized.

Optionally, any of the non aqueous phases or any of the non aqueous partially or totally desolventized phases or the first partial or totally desolventized phase produced in the crystallization step can be treated with urea or another compound forming complexes or adducts with fatty acids or their derivatives. To this end, a dissolution is formed at a temperature between 50 and 100° C. where the dissolution consists of between 5 and 40 g of the phase being subjected to the urea treatment for every 100 g of a solution of the compound that forms complexes or adducts in an organic solvent, preferably urea in ethanol, that contains approximately 30 g of urea per 100 g of ethanol. Then, the dissolution is cooled down to room temperature or less, forming a solid phase that comprising complexes or adducts and a solid free liquid phase. The complexes or adducts and the solid free liquid phase are separated either by filtration or centrifugation, and the solid free liquid phase is washed with water or an acidic solution until the remaining compound that forms complexes or adducts is dissolved in that phase has been extracted. Then, the solvents of the solid free liquid phase are removed, either totally or partially, to obtain what is referred to as a second partially or totally desolventized phase produced in the complex forming step, and comprising EPA and DHA in a concentration higher to that in the raw material.

Then, any of the non aqueous phases or any of the non aqueous partially or totally desolventized phases or the first partial or totally desolventized phase produced in the crystallization step or the second partial or totally desolventized phase produced in the complex formation are subjected to an esterification step. To this end, the phase is mixed with a monohydric alcohol such as methanol or ethanol or with a polyhydric alcohol such as glycerol in a ratio ranging from 500 g of alcohol for every 100 g of the phase, to 20 g of alcohol for every 100 g of phase, preferably from 20 to 200 g, and with a catalyst such as sulfuric acid, p-toluene sulfonic, methane sulfonic, ethane sulfonic or with a resin such as amberlite, in a ratio of 0.05 to 10 g of catalyst for every 100 g of phase. The esterification step can be carried out either batchwise or continuously in a stirred reactor, at a temperature between 10 and 150° C., preferably between 30 and 80° C. and at a pressure between 0.1 and 5 bar, preferably at atmospheric pressure. The time of esterification in the case of batchwise operation or residence time in the case of continuous operation ranges from 30 to 600 minutes, preferably between 60 and 240 minutes. At the end of the esterification step an esterified mixture is obtained comprising esters of fatty acids. Then, the catalyst is removed from the esterified mixture by filtration in case of solid catalyst or by neutralizing and washings with aqueous solutions in case of liquid catalyst, to form a catalyst free esterified mixture. The catalyst-free esterified mixture is desolventized evaporation, preferably at a reduced pressure and temperatures lower than 150° C., to obtain a desolventized mixture comprising esters of fatty acids.

Subsequently, the mixture of esters of desolventized fatty acids is distilled in a short-path distillation column to obtain a distillate and a residue.

The distillate or the residue can be again distilled under the above conditions obtain a second distillate and a second residue. The process can be repeated until a distillate or a residue is obtained containing the desired concentration of esters of EPA and DHA or a concentrate of EPA and DHA. The distillations can be carried out at a temperature lower than 180° C., preferably lower than 150° C. and a pressure lower than 1 mbar, preferably lower than 0.1 mbar. The resulting concentrates may comprise up to 95% in weight of EPA and DHA esters.

The EPA and DHA or any ester containing fraction can be further subjected to one or more additional steps of purification such as, fractionation by means of cooling at a temperature lower than −5° C. and separating the solids by filtration or centrifugation; deodorization in packed columns or tray columns at reduced pressure, and temperature below 200° C., preferably lower than 150° C. using either nitrogen or steam for deodorizing; adsorption by means of the use of infusorial earth, active carbon, zeolites and molecular sieve among others.

Likewise, optionally, the concentrates of EPA and DHA can be transesterified with glycerin to form concentrated glycerides of EPA and DHA.

One or more appropriate antioxidants may be added to the concentrate of EPA and DHA, such as tocopherol, esters of tocopherol, ascorbic acid and their derivatives, extract of rosemary, extract of boldo, among others. Preferably, the amount of antioxidant in the concentrates is less than 1% in weight, preferably less than 0.5% of the concentrate.

The concentrates of EPA and DHA obtained are free of the undesirable secondary effects of associated with the consumption of derivatives of fish oil, such as gastric reflux, stomach and skin irritation and meteorism, among others. Additionally, and surprisingly, the concentrates of EPA and DHA do not present reversion to fishy odor or flavor, allowing their utilization as ingredients of food or pharmaceutical products, without the need of resorting to flavor and odor maskers, encapsulations, and micro-encapsulation. Moreover, the process disclosed significantly reduces the content of Persistent Organic Pollutants and heavy metals that might be present in the fish oil, below the maximum levels permitted internationally. Furthermore, the process does not generate trans fatty acids and besides, but surprisingly and unexpectedly, it can also reduce in the content of trans fatty acids when they are present in the raw material.

DESCRIPTION OF THE FIGURE

With reference to FIG. 1, crude fish oil is fed through line (1) to a saponification reactor (4), a stirred vessel to which a stream sodium hydroxide solution is also fed via line (2) in a ratio equal to the saponification index of the oil or in excess of up to 20% and via line (3) a stream of aqueous ethanol at 50% is fed to the reactor. Reactor (4) operates at a temperature between 40 and 85° C. at a pressure between 1 and 2 bar and with residence time of 45 minutes to generate of saponified mixture. Said saponified mixture is fed via line (7) to a counter current extraction column (8) operating at pressure between 2 to 5 bar, and at a temperature between 20 and 60° C. The extraction column (8) is fed with a mixture of aliphatic hydrocarbons via line (9) whose boiling point ranges from 60 to 80° C. to recuperate via line (10) an extract phase comprising a mixture of aliphatic hydrocarbons and material extracted in said phase and to recuperate via line (11) a refined phase comprising alkaline salts of fatty acids. The refined phase is fed via line (11) to an acidulation reactor (12) to which a stream of hydrochloric acid is fed as well via line (13) at a ratio equal to the total alkalinity of the refined phase or in an excess of up to 10%. The reactor (12) operates at temperature between 20 and 70° C. under agitation, pressure of 1 to 2 bar and residence time of up to 30 minutes to generate an acidulated mixture. The acidulated mixture is fed into the settler (15) via line (14) to separate the non aqueous phase from the aqueous phase of the acidulation. The settler (15) operates at a temperature between 20 and 70° C., at a pressure between 1 and 2 bar and residence time between 5 and 60 minutes. The aqueous phase is removed via line (16) for its subsequent treatment, to recuperate solvents and glycerin. Via line (17) the non aqueous phase separated in settler (15) is fed into a washing reactor (18) where it is contacted under agitation with stream (19) comprising a solution of ethanol at 50% in water, to produce a washing mixture. Reactor (18) operates at temperature between 20 and 70° C., pressure of 1 and 2 bar and residence time between 1 and 30 minutes. The washing mixture of reactor (18) is fed into a decanter (21) via line (20) to separate the light phase from the heavy phase of the washing mixture. The decanter (21) operates at a temperature between 20 and 70° C., at a pressure between 1 and 2 bar and residence time between 5 and 60 minutes. The heavy phase is removed via line (22) for its subsequent treatment, to recover solvents or to recirculate it or part of it to the washing reactor (18). Via line (23), the light phase separated in the settler (21) is fed to an esterification reactor (24) also fed via line (25) with stream of a solution of p-toluene sulfonic acid dissolved in ethanol. The reactor (24) operates at a temperature between 40 and 85° C. under agitation, at a pressure between 0.5 and 2 bar and with residence time of 180 minutes to produce an esterified mixture. The esterified mixture is fed via line (26) to the washing and neutralization reactor (27) where it is contacted under agitation, at a temperature between 20 and 70° C., at a pressure of 1 and 2 bar and with residence time of between 1 and 30 minutes, with the stream (28) comprising a solution of sodium carbonate at 5% in water, to generate a neutralized washing mixture. The neutralized washing mixture of the washing reactor (27) is fed to a settler (31) via line (30) to separate a mixture of esters of fatty acids and an aqueous phase. The decanter (31) operates at a temperature between 20 and 70° C., at a pressure between 1 and 2 bar and residence time between 6 and 60 minutes. The aqueous phase is removed via line (32) for its subsequent treatment to recover solvents. Via line (33) the mixture of esters of fatty acids separated in the settler (31) is fed to a falling film evaporator (34) that operates at a temperature between 50 and 180° C., at a pressure between 1 and 100 mbar and residence time no greater than 30 minutes, to obtain a distillate and a desolventized residue comprising esters of fatty acids. Via line (35) the distillate is fed to a storage tank not shown. The esters of desolventized fatty acids are fed via line (36) to a short path evaporator (37) operating at a temperature between 50 and 180° C., at a pressure between 0.001 and 1 mbar. Via line (38) the distillate is removed from the short path evaporator (37) and via line (39) the residue of the distillation of the short path evaporator (37) is removed and fed to a short path evaporator (40). The short path evaporator (40) operates at a temperature between 50 and 180° C., at a pressure between 0.001 and 1 mbar. Via line (41) the residue of the distillation of the short path evaporator (40) is removed and via line (42) the distillate of the short path evaporator (40), comprising a concentrated mixture of esters of EPA and DHA is removed.

EXAMPLES

Examples 1 trough 11 illustrate ways in which this invention may be carried out as well as the outstanding organoleptic properties and oxidative stability of the concentrates obtained.

Comparative Example 1

EP 0 409 903

Preparation of an Ethyl Ester Concentrate of EPA and DHA from Salmon Oil According to the Process Disclosed by EP 0 409 903

300 g of salmon oil (sample M1) whose characteristics are shown in Table 2, 150 g of ethanol and 150 g of a sodium hydroxide solution in distilled water at 28% were placed into a 2000 ml Erlenmeyer flask. The mixture was refluxed and purged with nitrogen for one hour, resulting in full saponification of the salmon oil, afterwards 160 g of an aqueous solution of hydrochloric acid at 26% was added and the mixture was shaken vigorously for 5 minutes. Then, 450 ml of petroleum ether were added and was shaken once again. The mixture was placed in a 2000 ml separating funnel and allowed to settle to separate in an upper and a lower phase. The upper phase was removed and the lower aqueous phase was extracted two more times with 450 ml of petroleum ether.

The extracts of petroleum ether were collected in a 2000 ml funnel and were washed with water until neutrality. The washed extract was evaporated in a rotary evaporator operating at 10 mbar and 60° C. Subsequently, traces of petroleum ether were removed feeding the residue of the evaporation of the rotary evaporator to a short path distillation column KDL5 UIC, at a flow rate of 1250 ml/h, jacket temperature of 90° C., condenser temperature at −4° C., roller speed of 350 rpm and pressure of 4 mbar. A mixture of fatty acids of salmon oil was obtained with 30.1% of long chain ω-3 fatty acids (sample M2).

The mixture of fatty acids of salmon was fed into a short path distillation column KDL5 UIC, at a flow rate of 100 ml/h, jacket temperature of 65° C., condenser temperature at 4° C., speed of the rollers of 350 rpm, pressure of 0.005 mbar and a first distillate and a first residue were obtained. The first residue was subjected to a second step of short path distillation, at a temperature of 85° C. obtaining a second distillate and a second residue. The second distillate contained 52.2% of long chain ω-3 fatty acids (sample M3).

Analysis of the samples of comparative example 1 is shown in Table 2.

TABLE 2

| Analysis of samples of Comparative Example 1 | | | |
|---|---|---|---|
|  | Salmon Oil Sample M1 | First Distillate Sample M2 | Second Distillate Sample M3 |
| EPA, % p/p | 10.3 | 11.4 | 16.6 |
| DHA, % p/p | 15.1 | 16.8 | 30.7 |
| Total ω-3, % p/p | 28.2 | 30.1 | 52.2 |
| PCB, ppb | 148.6 | 133.2 | 96.7 |
| PCB as Dioxins, ppt | 4.6 | 4.5 | 4.1 |
| Dioxin + Furans, ppt | 2.7 | 2.4 | 2.1 |
| Peroxides, meq/kg | 7.2 | 1.3 | 1.1 |
| Anisidine | 6.1 | 2.4 | 1.9 |
| Totox | 20.3 | 8.7 | 4.1 |
| Heavy metals |  |  |  |
| Arsenic, ppb | 1200 | 538 | 359 |

Comparative Example 2

U.S. Pat. No. 5,130,061

Preparation of an Ethyl Ester Concentrate of EPA and DHA from Salmon Oil According to the Process Disclosed by U.S. Pat. No. 5,130,061

300 g of the salmon oil used in comparative example 1 and 200 g of a solution of sulfuric acid at 5% in absolute ethanol were mixed in a 2000 ml Erlenmeyer flask. The mixture was refluxed and purged with nitrogen for 8 hours. Excess ethanol was removed by distillation at a reduced pressure while the reaction mixture was cooled to room temperature. The residue of the distillation was diluted with 400 ml of hexane and was washed with 500 ml of water. The heterogeneous mixture was shaken vigorously. The aqueous phase was separated from the hexane phase in a separating funnel and the hexane phase was washed with water repeatedly until the pH of the aqueous phase was neutral. The washed hexanic extract was purified by passing it through a column of silica gel. Subsequently the purified hexane extract was evaporated in a rotary evaporator up to 10 mbar and 60° C. Traces of solvent were removed feeding the residue of the evaporation into a short path distillation column KDL5 UIC, at a flow rate of 1250 ml/h, jacket temperature of 90° C., condenser temperature at −4° C., roller speed of 350 rpm and pressure of 4 mbar. A mixture of ethyl esters was obtained containing 27.9% of long-chain (esterified) ω-3 fatty acids (sample M4).

The mixture of ethyl esters was fed into a short path distillation column KDL5 UIC, at a flow rate of 100 ml/h, jacket temperature 65° C., condenser temperature of 4° C., roller speed of 350 rpm, pressure of 0.005 mbar and a first distillate and a first residue were obtained. The first residue was subjected to a second stage of short path distillation, at a temperature of 85° C. obtaining a second distillate and a second residue. The second distillate contained 51.6% of long chain (esterified) fatty acids (sample M5).

Analysis of the samples of comparative example 2 is shown in Table 3.

TABLE 3

Analysis of samples of Comparative Example 2

|  | Salmon Oil Sample M1 | First Distillate Sample M4 | Second Distillate Sample M5 |
|---|---|---|---|
| EPA, % p/p | 10.3 | 9.9 | 17.1 |
| DHA, % p/p | 15.1 | 14.8 | 29.7 |
| Total ω-3, % p/p | 28.2 | 27.9 | 51.6 |
| PCB, ppb | 148.6 | 136.4 | 103.7 |
| PCB as Dioxins, ppt | 4.6 | 4.5 | 3.9 |
| Dioxin + Furanes, ppt | 2.7 | 2.5 | 2.3 |
| Peroxides, meq/kg | 7.2 | 7.5 | 3.9 |
| Anisidine | 6.1 | 6.0 | 2.4 |
| Totox | 20.3 | 21.0 | 10.2 |
| Heavy Metals |  |  |  |
| Arsenic, ppb | 1200 | 945 | 450 |

Example 1

Preparation of a Concentrate of Ethyl Esters of EPA and DHA of Salmon Oil 300 g of salmon oil used in comparative example 1, 150 g of ethanol and 150 g of sodium hydroxide solution in distilled water at 28% were placed in a 2000 ml Erlenmeyer flask. The mixture was refluxed and purged with nitrogen for one hour, resulting in full saponification of the salmon oil.

The saponified mixture was placed in a 3000 ml separating funnel and 150 g of ethanol, 150 g of distilled water and 900 g of hexane were added to the funnel. The resulting mixture was shaken vigorously and was left to settle. The upper hexanic phase was separated and the lower aqueous phase was extracted three more times with 700 ml of hexane. The hexane extracts were desolventized in a rotary evaporator at a reduced pressure.

The aqueous phase was acidulated by adding 200 g of an aqueous solution of hydrochloric acid at 20%. The resulting organic was washed with portions of an aqueous solution of ethanol at 50% until pH 4-5 and then it was evaporated in a rotary evaporator at 10 mbar and 60° C. A mixture of fatty acids was obtained containing 29.6% of long-chain ω-3 fatty acids (sample M6).

The mixture of fatty acids was mixed with 100 g of a solution of sulfuric acid at 1.0% in absolute ethanol and was refluxed for 2 hours. The reaction was considered finalized upon the mixture reaching a constant acid number. The reacted mixture was neutralized with 40 g of a solution of sodium carbonate at 10% in distilled water followed by washings with portions of 40 g of distilled water. Subsequently, the mixture was evaporated in a rotary evaporator at 10 mbar and 60° C. Traces of solvent were removed feeding the residue of the evaporation into a short path distillation column KDL5 UIC, at a flow rate of 1250 ml/h, jacket temperature of 90° C., condenser temperature at −4° C., roller speed of 350 rpm and pressure of 4 mbar. A mixture of ethyl esters was obtained containing 30.9% of long chain ω-3 fatty acids (sample M7).

The mixture of ethyl esters was fed into a short path distillation column KDL5 UIC, at a flow rate of 100 ml/h, jacket temperature of 65° C., condenser temperature 4° C., roller speed of 350 rpm, pressure of 0.005 mbar obtaining a first distillate and a first residue. The first residue was again distilled in the short path distillation column at a temperature of 85° C. obtaining a second distillate and a second residue. The second distillate contained 52.3% of long-chain ω-3 fatty acids (sample M8).

Analysis of the samples of Example 1 is shown in Table 4.

TABLE 4

Analysis of samples of Example 1

|  | Salmon Oil Sample M1 | Fatty Acids Sample M6 | Ethyl Esters Sample M7 | Second Distillate Sample M8 |
|---|---|---|---|---|
| EPA, % p/p | 10.3 | 10.1 | 10.3 | 20.4 |
| DHA, % p/p | 15.1 | 17.2 | 17.4 | 29.8 |
| Total ω-3, % p/p | 28.2 | 29.6 | 30.9 | 52.3 |
| PCB, ppb | 148.6 | 46.3 | 44.9 | 26.7 |
| PCB as Dioxins, ppt | 4.6 | 0.8 | 1.0 | 1.2 |
| Dioxin + Furanes, ppt | 2.7 | 0.6 | 0.6 | 0.8 |
| Peroxides, meq/kg | 7.2 | 1.1 | 1.2 | 0.1 |
| Anisidine | 6.1 | 0.9 | 1.1 | 0.3 |
| Totox | 20.3 | 3.1 | 3.5 | 0.5 |
| Heavy metals |  |  |  |  |
| Arsenic, ppb | 1200 | 200 | 205 | <100 |

Example 2

Preparation of a Concentrate of Ethyl Esters of EPA and DHA from Sardine Oil

Example 1 was duplicated using sardine oil, with a Totox value of 45. Analysis of samples is shown in Table 5:

TABLE 5

Analysis of samples Example 2

|  | Sardine Oil | Fatty acids | Ethyl Esters | Second distillate |
|---|---|---|---|---|
| EPA | 16.1 | 16.3 | 16 | 30.1 |
| DHA | 6.2 | 6.1 | 6.2 | 15.4 |
| Total ω-3 | 24.1 | 24.2 | 23.4 | 48.2 |
| PCB, ppb | 104.6 | 41.6 | 44.1 | 18.5 |
| PCB as Dioxins, ppt | 3.2 | 0.3 | 0.4 | 0.6 |
| Dioxin + Furanes, ppt | 2.1 | 0.3 | 0.3 | 0.4 |
| Peroxides, meq/kg | 10.7 | 3.5 | 3.6 | 0.1 |
| Anisidine | 23.6 | 1.9 | 1.8 | 0.1 |
| Totox | 45 | 8.9 | 9.0 | 0.2 |
| Heavy Metals |  |  |  |  |
| Arsenic, ppb | 980 | 345 | 330 | <100 |

Example 3

Preparation of a Concentrate of Ethyl Esters of EPA and DHA from Mackerel Oil Example 1 was duplicated using jack mackerel oil having a Totox value of 33. The results of the example are shown in Table 6:

TABLE 6

Analysis of samples of Example 3

|  | Jack Mackerel Oil | Fatty acids | Ethyl Esters | Second distillate |
|---|---|---|---|---|
| EPA | 5.4 | 5.4 | 5.1 | 15.7 |
| DHA | 16.8 | 16.9 | 16.3 | 32.2 |
| Total ω-3 | 24.4 | 24.6 | 22.6 | 50.1 |
| PCB, ppb | 91 | 26 | 27 | 18 |
| PCB as Dioxins, ppt | 3.7 | 0.9 | 1.0 | 1.1 |
| Dioxin + Furanes, ppt | 3.1 | 0.5 | 0.5 | 0.4 |
| Peroxides, meq/kg | 9.2 | 4.1 | 3.8 | 0.3 |
| Anisidine | 14.6 | 1.1 | 1.1 | 0.2 |
| Totox | 33 | 9.3 | 8.7 | 0.8 |
| Heavy metals |  |  |  |  |
| Arsenic, ppb | 890 | 210 | 196 | <100 |

Example 4

Preparation of a Concentrate of Ethyl Esters of EPA and DHA from Sardine Oil in a 200 Liter Reactor A 200 liters baffled, jacketed, turbine agitated stainless steel reactor was charged with 15 kg of ethanol, 15 kg of an aqueous solution of sodium hydroxide at 18.7% and 15 kg of sardine oil (sample M10) whose characteristics are shown in table 7. The mixture was heated up to 55° C. for one hour and was then cooled to 45° C. Then 45 kg of hexane were added and it was stirred for 10 minutes. The mixture was left to settle for 15 minutes and the organic phase was separated from the aqueous phase. The aqueous phase was extracted twice using the same procedure. The hexanic extracts were collected and desolventized at a reduced pressure. The aqueous or refined phase was acidulated at a temperature of 25° C. with 28 kg of a solution of hydrochloric acid at 10% and 5 stirring the mixture for 5 minutes. The acidulated mixture was left to settle for 15 minutes, in order to separate the aqueous and the organic phases. The organic phase, once removed, was washed with 10 kg of an aqueous solution of ethanol at 50% to pH 5. The washed organic phase was filtered to separate suspended solids. The organic phase, washed and filtered, was diluted with hexane up to 20% in weight and was transferred to a second reactor of 150 liters, provided with an anchor type agitator and cooling jacket, and was cooled down to −25° C. The cooled mixture at −25° C. was filtered in a bag filtered through polyester mesh of 10 microns. The filtrate obtained was charged into the 200 liters reactor and was heated at 55° C. at a pressure of 200 mbar. The mixture of desolventized fatty acids was contacted with a solution of 20 kg of urea dissolved in 55 kg of ethanol at 80° C. The mixture was stirred to form the complex with urea and then it was cooled to 15° C. The precipitated solids were separated by filtration and a solid free filtrate was obtained. The solid free filtrate was cooled to 1° C. and filtered to obtain a second solid free filtrate. The second solid free filtrate was mixed with 3 kg of hydrochloric acid dissolved in 50 kg of water and 20 kg of hexane, was stirred and left to settle. The acidic aqueous phase was separated and the organic phase was washed with 5 kg of water until the pH was neutral. The organic phase was desolventized at 80° C. and 50 mbar. 2.3 kg of a mixture of fatty acids were obtained containing 77.2% of ω-3 fatty acids (sample M-11).

Then, 40 g of sulfuric acid dissolved in 10 kg of ethanol were charged into the reactor and heated at 80° C. Subsequently the reactor was cooled to 40° C. and 10 kg of hexane was added together with 70 g of sodium carbonate dissolved in 5 kg of water. The mixture was stirred for 5 minutes then after settling the aqueous phase was separated from the organic phase. The organic phase was washed with 5 kg of water and desolventized at 80° C. and 50 mbar. 2.5 kg of a mixture of ethyl esters of fatty acids were obtained containing 70.9% of ω-3 fatty acids (sample M-12).

Traces of solvent from the ethyl esters were removed feeding the mixture to a short path distillation column KDL5 UIC, at a flow rate of 1250 ml/h, jacket temperature of 80° C., condenser temperature at −5° C., roller speed of 350 rpm and pressure of 4 mbar. The mixture of distilled ethyl esters was fed to a short path distillation column KDL5 UIC, at a flow rate of 90 ml/h, jacket temperature of 85° C., condenser temperature at 4° C., roller speed of 350 rpm, pressure of 0.005 mbar obtaining a first distillate and a first residue.

The first residue was mixed with 1% of Tonsil at 70° C. and at reduced pressure for 30 minutes and was filtered obtaining a purified filtrate which was subjected to a second stage of short path distillation, at a temperature of 98° C. obtaining a second distillate and a second residue. The second distillate contained 86.2% of long chain ω-3 fatty acids. The second distillate was cooled to −25° C. for 12 hours and then filtered. The resulting filtrate was fed to a deodorization column, at a temperature of 100° C. using nitrogen at 130° C. and at the pressure of 15 mbar for the deodorization. A deodorized concentrate of ethyl esters of long chain ω-3 fatty acids (sample M13) was obtained to which a mixture of esters of tocopherol, ascorbyl palmitate and extract of rosemary at a concentration of 2550 ppm was added.

Analysis of the samples of Example 4 is shown in Table 7.

TABLE 7

Analysis of samples of Example 4

|  | Sardine Oil Sample M10 | Fatty Acids Sample M11 | Ethyl Esters Sample M12 | Second Distillate Sample M13 |
|---|---|---|---|---|
| EPA | 10.3 | 29.9 | 27.1 | 29.1 |
| DHA | 15.1 | 44.3 | 40.5 | 56.2 |
| Total ω-3 | 26.1 | 77.2 | 70.9 | 86.3 |
| PCB, ppb | 98 | 44 | 46 | 17 |
| PCB as Dioxins, ppt | 3.8 | 1.8 | 1.7 | 1.2 |
| Dioxins + Furanes, ppt | 4.1 | 0.4 | 0.5 | 0.3 |
| Peroxides, meq/kg | 5.1 | 0.9 | 1.3 | 0.1 |
| Anisidine | 8.9 | 0.8 | 0.8 | 0.1 |
| Totox | 19.1 | 2.6 | 3.4 | 0.3 |
| Heavy Metals |  |  |  |  |
| Arsenic, ppb | 1090 | 304 | 321 | <100 |

Example 5

Preparation of a Concentrate of Ethyl Esters of EPA and DHA from Mackerel Oil in 200 Liters Reactor A 200 liters baffled, jacketed, turbine agitated stainless steel reactor, was charged with 15 kg of ethanol, 15 kg of an aqueous solution of sodium hydroxide at 17.4% and 15 kg of jack mackerel oil of example 3 and whose characteristics are shown in table 8. The mixture was heated at 75° C. for one hour and then was cooled to 45° C. Next, 45 kg of hexane were added and stirred for ten minutes. The mixture was left to settle for 15 minutes and the organic phase was separated from the aqueous phase. The aqueous phase was extracted twice by the same procedure. The aqueous phase or refined phase was acidulated at a temperature of 25° C. with 26 kg of a solution of hydrochloric acid at 10% and stirred for 5 minutes. The acidulated mixture was left to settle for 15 minutes, and then the aqueous phase was separated from the organic phase. The organic phase was washed with 10 kg of 50% aqueous solution until pH 5. The washed organic phase was mixed with 100 g of sulfuric acid dissolved in 10 kg of ethanol and was heated distilling a mixture of solvents until the temperature of 80° C. was reached. Subsequently, the reactor was cooled to 40° C., 350 g of sodium carbonate dissolved in 5 kg of water was added and was stirred for 10 minutes. The aqueous phase was separated. The organic phase was washed with 5 kg of water and was desolventized at 80° C. and 50 mbar. 14.6 kg of a mixture of ethyl esters of fatty acids were obtained containing 24.7% of ω-3 fatty acids. (sample M-14).

Traces of solvent of the ethyl esters were removed feeding the mixture to a short path distillation column KDL5 UIC, at a flow rate of 1250 ml/h, jacket temperature of 80° C., condenser temperature at −5° C., roller speed of 350 rpm and pressure of 4 mbar. The distilled ethyl esters were fed to a short path distillation column KDL5 UIC, at a flow rate of 90 ml/h, jacket temperature of 85° C., condenser temperature at 4° C., roller speed of 350 rpm, pressure of 0.005 mbar, obtaining a first distillate and a first residue.

Subsequently, the first residue was subjected to a second short path distillation, at a temperature of 96° C. and a second distillate and a second residue were obtained. The second distillate contained 51.2% of long chain ω-3 fatty acids (Sample M15). Finally, 2000 ppm of tocopherol acetate (Grindox Toco 70, Danisco) was mixed with the second distillate.

Analysis of samples of Example 5 is shown in Table 8.

TABLE 8

Analysis of samples of Example 5

|  | Jack mackerel oil | Ethyl Esters Sample M14 | Second distillate Sample M15 |
|---|---|---|---|
| EPA | 5.4 | 5.8 | 12.9 |
| DHA | 16.8 | 16.1 | 35.7 |
| Total ω-3 | 24.4 | 24.7 | 51.2 |
| PCB, ppb | 91 | 31 | 15 |
| PCB as Dioxins, ppt | 3.7 | 1.4 | 1.0 |
| Dioxin + Furanes, ppt | 3.1 | 0.7 | 0.4 |
| Peroxides, meq/kg | 9.2 | 3.4 | 0.1 |
| Anisidine | 14.6 | 0.9 | 0.3 |
| Totox | 33 | 7.7 | 0.5 |
| Heavy Metals |  |  |  |
| Arsenic, ppb | 890 | 269 | <100 |

Example 6

Cis/Trans Isomers of EPA in the Concentrates of Examples 2 and 3

One gram of the second distillate of Example 2 was saponified with a solution of potassium hydroxide in aqueous methanol at 10° C. for 24 hours. Then, the saponified mixture was acidulated with hydrochloric acid at 1%, at 10° C. The acidulated mixture was extracted with petroleum ether three times. The extracts of petroleum ether were collected, washed with an aqueous solution of methanol at 20% and the washed extract was desolventized in a rotary vaporizer at 20° C. and 5 mbar. The residue was methylated using boron trifluoride. 870 mg of methyl esters of long chain ω-3 fatty acids were obtained. A sample of methyl esters of long chain ω-3 fatty acids of the second distillate of example 3 was prepared in a similar manner.

Similarly, methyl esters of fatty acids of sardine oil of Example 2 and jack mackerel oil of Example 3 were prepared using the technique described.

A standard of methyl ester of all cis (5, 8, 11, 14, 17) eicosapentaenoic acid was injected in a gas chromatograph series 7890A provided with selective mass detector of 5975Cinert, of Agilent Technologies, using a 100-meter SP 2560 column, having an internal diameter of 0.25 mm and a film thickness of 0.20 microns. The chromatographic program was: initial temperature 140° C. for 5 minutes; increasing temperature at the rate of 2° C./min up to 240° C. and maintained at 240° C. for 30 minutes. Injector and detector temperature was 250° C. Extra pure helium was used as carrier. The mass spectrums of the standard were stored in the data library.

Subsequently, the samples of the methyl esters prepared from the samples of the second distillate of examples 2 and 3 and of the methyl esters obtained from the original oils of Examples 2 and 3 were injected into the chromatograph. The software Chemstation was used to obtain a "Match Quality" of 99% for each one of the samples methylated. Additionally, the chromatograms and spectrograms of all the methyl esters chromatographied were compared and no new peaks were detected associated to the isomerization of EPA.

Additionally, the content of trans isomers of fatty acids was determined from 16 to 22 carbon atoms, according to the methodology o AOCS Ce 1h-05. The results are shown in Table 9. As can be seen, in the tests of Examples 2 and 3, no trans isomers were generated and unexpectedly there was a decrease of said isomers in the final product.

TABLE 9

Analysis of trans fatty acids in concentrates of Examples 2 and 3.

| % pp methyl ester Fatty Acids trans | Sardine Oil Ezample 2 | Second Distillate Example 2 | Jack mackerel oil Example 3 | Second Distillate Example 3 |
|---|---|---|---|---|
| C16:1 T | 0.00% | 0.00% | 0.00% | 0.00% |
| C18:1 T | 2.02% | 1.18% | 0.37% | 0.28% |
| C18:2 T | 0.22% | 0.05% | 0.15% | 0.13% |
| C18:3 T | 0.00% | 0.00% | 0.00% | 0.00% |
| C20:1 T | 0.00% | 0.00% | 0.00% | 0.00% |
| C22:1 T | 0.00% | 0.00% | 0.00% | 0.00% |

Example 7

Sensory Evaluation and Determination of the Stability of Samples of Ethyl Esters of Fatty Acids of Examples 2 and 3

Organoleptic properties and stability were evaluated by a trained panel of 12 panelists. Samples to be evaluated were given to each panelist in small glasses coded with 3 random digits and containing 15 ml of samples. The evaluation was carried out at a Sensory Evaluation Laboratory about 11:00 in the morning.

In order of assessing the sensorial characteristics of the products the following parameters were considered: appearance, aroma, flavor, rancidity and presence of extraneous flavors and odors. The measuring scale for said parameters ranged from 1 to 9 points, where 9 stands, in the case of flavor for "excellent, typical, exceptionally agreeable" and 1 for "strange, disagreeable, putrid". In the case of rancidity, the criterion had a range of 5 points in which 5 meant "without rancidity" and 1 "extremely rancid".

Table 10 presents the average results obtained in the organoleptic assessment of the samples of ethyl esters of fatty acids M15 of fresh samples, Example 5 (A) and the same samples after 29 weeks of storage at room temperature. No flavor, odor or appearance masking agents were added to the samples.

TABLE 10

Results organoleptic evaluation and stability Example 7

| Sample | Appearance | Aroma | Flavor | Rancidity |
|---|---|---|---|---|
| M15 Example 5 (A) | 7.5 | 7.6 | 7.1 | 4.7 |
| M15 Example 5 (B) | 7.9 | 7.4 | 7.2 | 4.6 |

Appearance: Scored of 7.5, meaning the appearance is "good".
Aroma: The score obtained was 7.6, qualifying as "good".
Flavor: With regard to flavor, the sample scored 7.1 meaning "good".
Rancidity: The samples scored of 4.6 which means "low in rancidity".

As can be seen, all of the samples had acceptable organoleptic properties and stability.

Example 8

Secondary Effects of Ingested Samples

To compare the secondary effects caused by different concentrates of EPA and DHA obtained from fish oil, 10 volunteers were divided into two groups, A and B, of 5 individuals each.

900 g of yoghurt were mixed with 100 grams of commercial ethyl esters of fatty acid preparation containing 33 g of EPA and 22 g of DHA (Sample 1). In a parallel way 100 g of ethyl esters of Example 5 sample M15 were mixed as well with 900 g of yoghurt (Sample 2).

Each member of group A ingested 150 g of yoghurt mixture of Sample 1, and each member of group B ingested 150 g of yoghurt mixture of Sample 2. Three hours following ingestion 4 members of group A and 1 member of group B reported experiencing gastric reflux.

A week later the test was repeated with the same individuals of groups A and B using freshly prepared Sample 1 and Sample 2 as described above but this time members of group A were given Sample 2 and members of group b were given Sample 1. Three hours after ingestion none of the embers of group A experienced gastric reflux meanwhile all 5 members of group B reported experiencing gastric reflux.

It can be concluded that the concentrates of EPA and DHA prepared according to the process herein disclosed do not exhibit the characteristic secondary effects commonly associated with the ingestion of fish oil derivates.

Example 9

Sensory Evaluation of a Sample Kept Under Oxidative Conditions

A Petri dish of 15 cm in diameter with 20 g of sample M15 of example 5 was kept in a forced convection oven at 45° C. for 6 hours. Subsequently, the sample was removed from the oven and allowed to cool.

The sample was evaluated by a panel of 5 people. No fishy smell was detected.

The test was repeated with sample M3 of comparative example 1. A rancid fishy smell was noticed by the panel.

The test was repeated with sample M5 of comparative example 2. Again, a rancid fishy smell was noticed by the panel.

The test was repeated with the sample of ethyl esters of fatty acids 33/22 EPA/DHA used in example 8. Again, a rancid fishy smell was noticed by the panel.

Example 10

Determination of the Oxidative Stability of Sample M15

The oxidation stability a portion of sample M15 of example 5 was measured by means of the Rancimat Test method. The induction time at 80° C. was 28.11±0.97 hours. In parallel the Rancimat tests was carried out on the sample of ethyl esters 33/22 used in example 8. The induction time at 80° C. was 1.67±0.10 hours.

Example 11

Mass Spectrum of a Sample

A sample of the hexanic residue of Example 4 was determined by GC-MS in a HP7890 Chromatograph coupled to a 5975Cinert provided with a mass detector. The chromatographic report indicated the presence in the sample of over 50 compounds in a concentration higher than 1000 ppm as can be seen in table 11.

TABLE 11

GC-MS analysis of the hexanic residue of example 4

| N° | Name of Compound | Match, % | CAS # |
|---|---|---|---|
| 1 | beta.-Pinene | 93 | 000127-91-3 |
| 2 | 1,2-Benzenedicarboxylic acid, mono (2-ethylhexyl) ester | 50 | 004376-20-9 |
| 3 | 1,4-Butanediamine, N-(3-aminopropyl) | 47 | 000124-20-9 |
| 4 | 1,6-Octadien-3-ol, 3,7-dimethyl | 30 | 000078-70-6 |
| 5 | 1-Anliinoisoquinoline | 41 | 013797-20-1 |
| 6 | 1-Nonadecene | 94 | 018435-45-5 |
| 7 | 1R-.alpha.-Pinene | 96 | 007785-70-8 |
| 8 | 2(1H)-Naphthalenone, 3,4,4a,5,6,7-hexahydro-4a-[(methylamino)methyl] | 43 | 1000197-08-7 |
| 9 | 2,3-Dihydro-4-methyl-8-nitro-1H-1,5-benzodiazepin-2-one | 52 | 037546-88-6 |
| 10 | 2-Decanone | 55 | 000693-54-9 |
| 11 | 3,5-di-tert-Butyl-4-hydroxybenzaldehyde | 64 | 001620-98-0 |
| 12 | 3,5-di-tert-Butyl-4-hydroxybenzylalcohol | 93 | 000088-26-6 |

TABLE 11-continued

GC-MS analysis of the hexanic residue of example 4

| N° | Name of Compound | Match, % | CAS # |
|---|---|---|---|
| 13 | 3-Carene | 95 | 013466-78-9 |
| 14 | 3-Cyclohexen-1-ol, 4-methyl-1-(1-methylethyl) | 93 | 000562-74-3 |
| 15 | 3-Fluoro-2,2,3,4,4,5,5,6,6,7,7-undecamethyl-[1,2,3,4,5,6,7]oxahexasilepane | 49 | 1000311-73-1 |
| 16 | 4,4'-Ethylenebis(2,6-di-tert-butyl phenol) | 94 | 001516-94-5 |
| 17 | 4,7,10,13,16,19-Docosahexaenoic acid, methyl ester, (all-Z) | 38 | 002566-90-7 |
| 18 | 4-[4-Methylamino-1-methylbutylamino]-7-chloroquinoline | 27 | 031510-53-9 |
| 19 | 5-(2-Aminopropyl)-2-methylphenol | 38 | 021618-99-5 |
| 20 | 5,8,11,14,17-Eicosapentaenoic acid, methyl ester, (all-Z) | 86 | 002734-47 |
| 21 | 5-Androsten-17.alpha.-ethynyl-3.beta.,17.beta.-diol | 70 | 1000126-90-5 |
| 22 | Acetamide, 2,2,2-trichloro | 53 | 000594-65-0 |
| 23 | Benzene, 1-methyl-2-(1-methylethyl) | 97 | 000527-84-4 |
| 24 | Benzo[h]quinoline, 2,4-dimethyl | 46 | 000605-67-4 |
| 25 | Benzoic acid, 3,5-bis(1,1-dimethylethyl)-4-hydroxy-, methyl ester | 60 | 002511-22-0 |
| 26 | Benzyl alcohol, .alpha.-(1-aminoethyl)-m-hydroxy | 25 | 000054-49-9 |
| 27 | Butanamide, 3-methyl | 38 | 000541-46-8 |
| 28 | Butylated Hydroxytoluene | 89 | 000128-37-0 |
| 29 | Cholest-5-en-3-ol (3.beta.) | 99 | 000057-88-5 |
| 30 | Citronellyl isobutyrate | 64 | 000097-89-2 |
| 31 | Cyclohexane, 1,2,4-triethenyl | 45 | 002855-27-8 |
| 32 | Cyclopropanemethanol, 2-methyl-2-(4-methyl-3-pentenyl) | 38 | 000541-05-9 |
| 33 | Dihydrocoumarin, 4,4,5,7,8-pentamethyl | 46 | 039170-97-3 |
| 34 | dl-Alanyl-l-phenylalanine | 43 | 108740-86-9 |
| 35 | Dodecane | 58 | 000112-40-3 |
| 36 | Dodecane, 4-methyl | 58 | 006117-97-1 |
| 37 | Eucalyptol | 98 | 000470-82-6 |
| 38 | Heptanamide, N-phenyl | 38 | 056051-98-0 |
| 39 | Hexadecane | 95 | 000544-76-3 |
| 40 | Hexadecanoic acid, ethyl ester | 98 | 000628-97-7 |
| 41 | Methyl (Z)-5,11,14,17-eicosatetraenoate | 50 | 059149-01-8 |
| 42 | Pentadecane | 96 | 000629-62-9 |
| 43 | Pentadecane, 2,6,10,14-tetramethyl | 91 | 001921-70-6 |
| 44 | Phenethylamine, p,.alpha.-dimethyl | 43 | 000064-11-9 |
| 45 | Phenol, 2,6-bis(1,1-dimethylethyl ethylethyl) | 50 | 004130-42-1 |
| 46 | Phenol, 3-(1,1-dimethylethyl)-4-methoxy | 60 | 000088-32-4 |
| 47 | Phthalic acid, butyl hexyl ester | 59 | 1000308-99-5 |
| 48 | Pterin-6-carboxylic acid | 22 | 000948-60-7 |
| 49 | Squalene | 99 | 007683-64-9 |
| 50 | Tetradecane | 92 | 000629-59-4 |
| 51 | Thiocyanic acid, 5.alpha.-cholestan-3.beta.-yl ester | 38 | 020997-50-6 |
| 52 | Thiocyanic acid, 5.alpha.-cholestan-3.beta.-yl ester | 52 | 020997-50-6 |
| 53 | Thiophene, 2,5-dibutyl | 59 | 006911-45-1 |
| 54 | Tridecane | 92 | 000629-50-5 |
| 55 | Undecanoic acid, ethyl ester | 70 | 000627-90-7 |

As can be concluded from the data shown in Table 11, the process disclosed is capable of removing a large family of compounds in marine oils, including both naturally occurring compounds different ω-3 fatty acids and contaminants, which could be responsible of secondary effects and undesired reversions of flavor and odor of many fish oil concentrates.

The invention claimed is:

1. Concentrate of esters of EPA and DHA from marine oil wherein the total content of esters of EPA and DHA is at least 40% by weight of the concentrate, the trans isomer content of the concentrates is equal to or lower than the content of trans isomers of the crude or refined marine oil, the concentrates have neutral organoleptic properties and oxidative stability, their content of PCBs is lower than 90 ng/g and their content of dioxins and furans is at most 2 pg/g of concentrate.

2. The concentrate of esters of EPA and DHA of claim 1 further comprising an antioxidant selected from the group consisting of tocopherol, esters of tocopherol, ascorbic acid and their derivatives, extracts of rosemary, and extract of boldo.

3. The concentrate of esters of EPA and DHA of claim 2 wherein the amount of antioxidant is less than 1% of the concentrates.

* * * * *